(12) United States Patent
Ichikawa et al.

(10) Patent No.: US 7,473,148 B2
(45) Date of Patent: Jan. 6, 2009

(54) OUTBOARD MOTOR

(75) Inventors: Akiko Ichikawa, Saitama (JP); Koji Yasuda, Saitama (JP); Mitsuaki Kubota, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/655,296

(22) Filed: Jan. 19, 2007

(65) Prior Publication Data
US 2007/0202755 A1 Aug. 30, 2007

(30) Foreign Application Priority Data
Feb. 27, 2006 (JP) ............................. 2006-050125

(51) Int. Cl.
*B60L 11/00* (2006.01)
*B63H 21/17* (2006.01)
*B63H 5/125* (2006.01)
*B63H 20/08* (2006.01)
*B63H 21/21* (2006.01)
*B60W 10/04* (2006.01)

(52) U.S. Cl. ............................ 440/6; 440/61 G; 440/86

(58) Field of Classification Search .................. 440/86, 440/83, 6, 1, 61 G
See application file for complete search history.

(56) References Cited

U.S. PATENT DOCUMENTS 2,528,480 A * 10/1950 Wilson et al. ................. 440/86
3,230,698 A * 1/1966 Nettles ......................... 60/718
7,195,525 B2 * 3/2007 Watabe et al. ................. 440/6
7,300,322 B2 * 11/2007 Kitani et al. ................... 440/6
7,314,396 B2 * 1/2008 Kubota et al. ................ 440/83
2006/0240723 A1 * 10/2006 Kubota et al. ................ 440/83
2007/0068163 A1 * 3/2007 Ishikawa et al. ............. 60/700

FOREIGN PATENT DOCUMENTS

JP 59-230894 12/1984

* cited by examiner

*Primary Examiner*—Jesús D Sotelo
*Assistant Examiner*—Daniel V Venne
(74) *Attorney, Agent, or Firm*—Carrier, Blackman & Associates, P.C.; William D. Blackman; Joseph P. Carrier

(57) ABSTRACT

An outboard motor adapted to be mounted on a stern of a boat and having a propeller to propel the boat, a power source which produces rotational output, a drive unit including a vertical shaft which transmits the rotational output of the power source to the propeller through a gear mechanism, and an interlock unit which detachably interlocks the power source to the drive unit. The changeable power source includes one of an internal combustion engine, an electric motor and a combination of the engine and the motor. The interlock unit interlocks one of the engine, the motor and the combination of the engine and the motor to the drive unit as the power source for propelling the boat, thereby enabling to freely change its power source as desired in accordance with a user's current needs and purposes.

13 Claims, 11 Drawing Sheets

OUTBOARD MOTOR

CROSS-REFERENCE TO RELATED APPLICATION

The present application claims priority under 35 USC 119 based on Japanese Patent Application No. 2006-050125, filed on Feb. 27, 2006, the entire disclosure of which is incorporated herein by reference.

BACKGROUND OF THE INVENTION

1. Field of the Invention

This invention relates to an outboard motor, more particularly to an outboard motor whose power source can be freely changed among an internal combustion engine, electric motor and combination thereof.

2. Description of the Related Art

Among outboard motors, there are known three kinds of outboard motors, i.e., one equipped with an internal combustion engine as its propeller power source, another equipped with an electric motor as its power source and, as taught, for example, by Japanese Laid-Open Patent Application No. Sho 59(1984)-230,894 (page 2, left column, line 9 to 13, FIG. 1, etc.), the other equipped with a combination of an internal combustion engine and an electric motor as its power source (hybrid outboard motor). One of the above three kinds of power sources is mounted on a boat (hull) to be used.

However, outboard motor power sources are different in their characteristics each other, for instance the internal combustion engine has good high-speed performance, the electric motor has a characteristic of quietness, and the like. Therefore, there is a demand for easily changing an outboard motor power source to be mounted.

SUMMARY OF THE INVENTION

An object of this invention is therefore to overcome the foregoing disadvantage by providing an outboard motor whose power source can be freely changed among three kinds of power sources, i.e., an internal combustion engine, electric motor and combination thereof in accordance with purposes.

In order to achieve the object, this invention provides an outboard motor adapted to be mounted on a stern of a boat and having a propeller to propel the boat, comprising: a power source which produces rotational output; a drive unit including a vertical shaft which transmits the rotational output of the power source to the propeller through a gear mechanism; and an interlock unit which detachably interlocks one of an internal combustion engine, an electric motor and a combination of the engine and the motor to the drive unit as the power source.

BRIEF DESCRIPTION OF THE DRAWINGS

The above and other objects and advantages of the invention will be more apparent from the following description and drawings in which.

DETAILED DESCRIPTION OF THE PREFERRED EMBODIMENT

An outboard motor according to a preferred embodiment of the present invention will now be explained with reference to the attached drawings.

Figure 1:
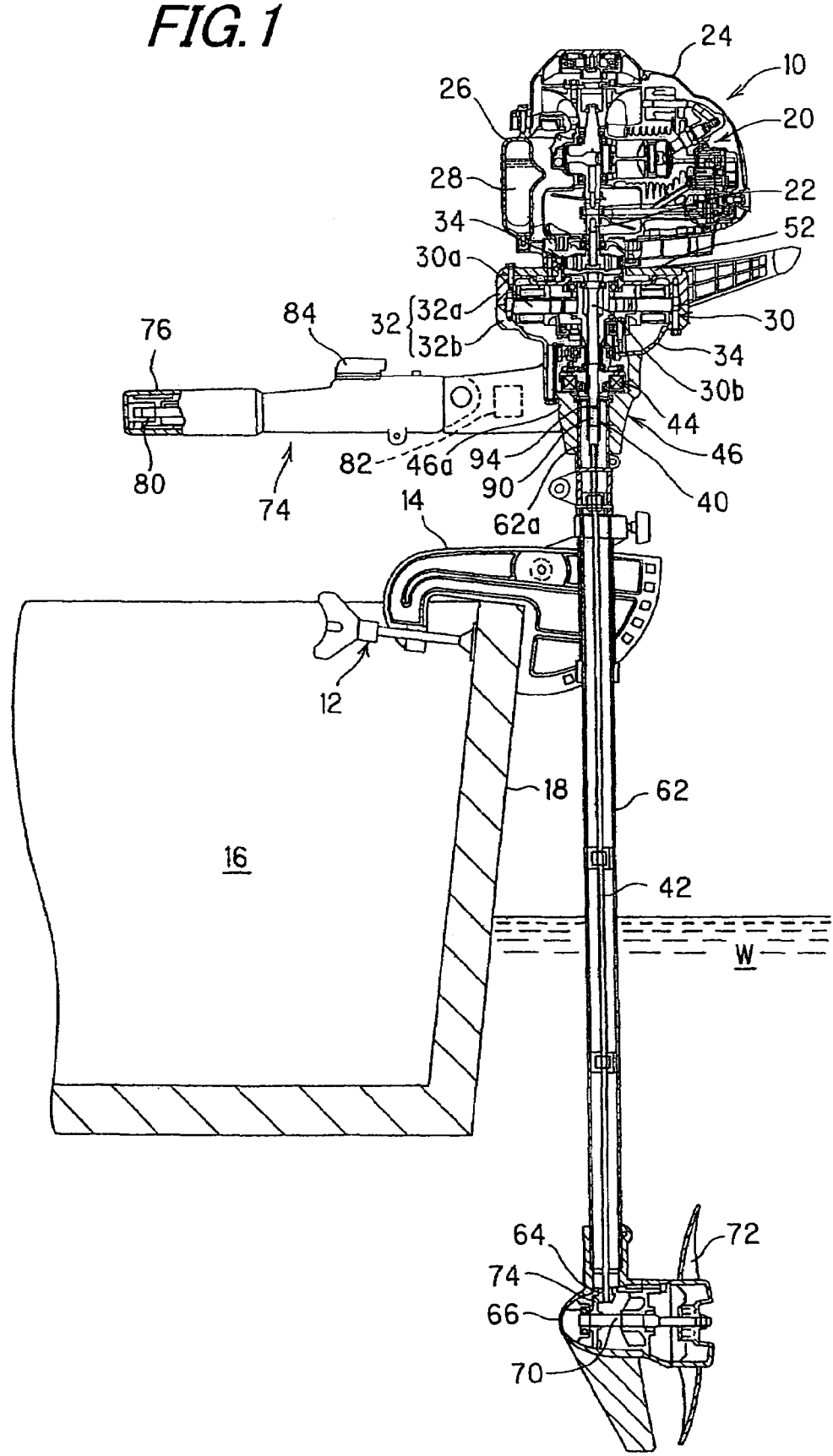
FIG. 1 is a partially sectional view showing an outboard motor according to an embodiment of this invention.

FIG. 1 is a partially sectional view showing an outboard motor according to an embodiment of this invention.

The outboard motor is designated by reference numeral 10 in FIG. 1. The outboard motor 10 is mounted on the stern (transom) 18 of a boat or hull 16 by means of two stern brackets 14 (only one shown in FIG. 1) equipped with a screw-type clamping device 12. As shown in the figure, the outboard motor 10 is equipped with an internal combustion engine (power source; hereinafter called "engine") 20 at its upper portion in the vertical direction.

Figure 2:
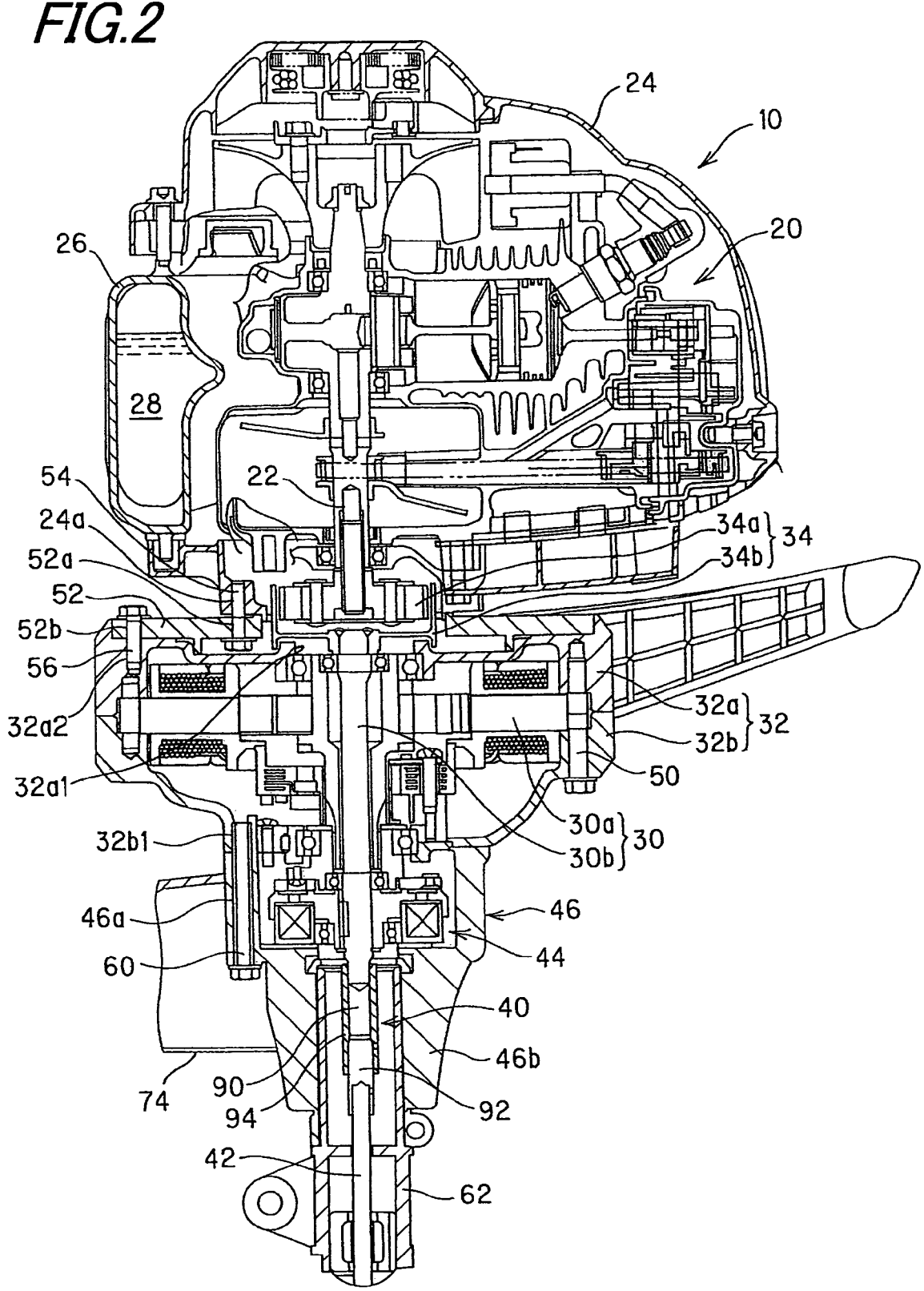
FIG. 2 is an enlarged partially sectional view of a region of the engine of the outboard motor shown in FIG. 1.

FIG. 2 is an enlarged partially sectional view of a region of the engine 20 of the outboard motor shown in FIG. 1.

The engine 20 is a spark-ignition, one-cylinder gasoline engine with a displacement of about 50 cc and generates the power output of 1.5 kW, i.e., about 2PS. The engine 20 has its crankshaft 22 aligned parallel to the gravity direction, i.e., in the vertical direction when mounted on the boat 16. The engine 20 and crankshaft 22 are enclosed by an engine case 24. A fuel tank 26 is installed near the engine 20 and stores fuel, i.e., gasoline fuel 28 to be supplied to the engine 20.

An electric motor (power source; generator-motor) 30 is installed in the outboard motor 10 vertically downward of the engine 20. The motor 30 is a DC brushless motor comprising a stator 30a and a rotor or output shaft 30b and is supplied with voltage from a battery (not shown) disposed at the boat 16 via a battery cable (not shown) and the like to produce an output of several hundred Watts. The electric motor 30 has its output shaft 30b aligned parallel to the vertical direction and is enclosed by a motor case 32.

A clutch, more precisely a centrifugal clutch 34 is installed between the engine 20 and the motor 30 and connect/disconnect an output to be transmitted from the engine 20 to the output shaft 30b. Specifically, the lower end of the crankshaft 22 of the engine 20 and the upper end of the output shaft 30b of the motor 30 are connected or combined through the centrifugal clutch 34.

The centrifugal clutch 34 comprises a clutch shoe 34a pivotally supported at the lower end of the crankshaft 22 so as to be increased in diameter, a clutch spring (not shown) urging the clutch shoe 34a in the direction of reducing the diameter and a clutch outer 34b fastened to the output shaft 30b of the motor 30 while surrounding the clutch shoe 34a.

When the crankshaft 22 is rotated at a speed exceeding a predetermined rotation speed, the clutch shoe 34a is made increased in diameter and pressed onto the inner wall of the clutch outer 34b to connect the crankshaft 22 to the output shaft 30b. Specifically, the engine 20 is started by the motor 30 and after started, when a speed of the engine exceeds the predetermined speed, the motor 30 is rotated by the engine 20 to produce electric energy that is charged by the battery.

It should be noted that in this embodiment the engine 20 and electric motor 30 combined via the centrifugal clutch 34 is called the "combination of the engine 20 and electric motor 30."

The upper end of a vertical shaft (drive unit) 42 is detachably interlocked to the lower end of the output shaft 30b of the motor 30 through an interlock unit 40. Thus the combination of the engine 20 and electric motor 30 is configured so that the motor 30 is located at a position between the engine 20 and the interlock unit 40.

Between the motor 30 and the interlock unit 40 is disposed with an electromagnetic clutch 44 that connects/disconnects transmission of an output from the engine 20 or motor 30 to the interlock unit 40, vertical shaft 42 and the like. Specifically, the output shaft 30b of the motor 30 and the interlock unit 40 are interconnected by the electromagnetic clutch 44.

When the clutch 44 is energized, it connects the output shaft 30b to the interlock unit 40, while, when being deenergized, it cuts off the connection between the output shaft 30 and interlock unit 40. The clutch 44 and interlock unit 40 are housed in a clutch housing 46 installed downward of the motor case 32.

The foregoing engine case 24, motor case 32 and clutch housing 46 will be explained.

The motor case 32 downward of the engine case 24 has a divided structure of two parts, i.e., an upper motor case 32a in which the lower or bottom surface and the center region of the upper surface are opened and a lower motor case 32b in which the upper surface and the center region of the lower surface are opened. The divided two parts are fastened by a bolt 50. The opening formed at the center region of the upper surface of the upper motor case 32a is indicated by a symbol 32a1. An engine attachment plate (interlocking member; hereinafter simply called "plate") 52 is inserted between the engine case 24 and the upper motor case 32a.

Figure 3:
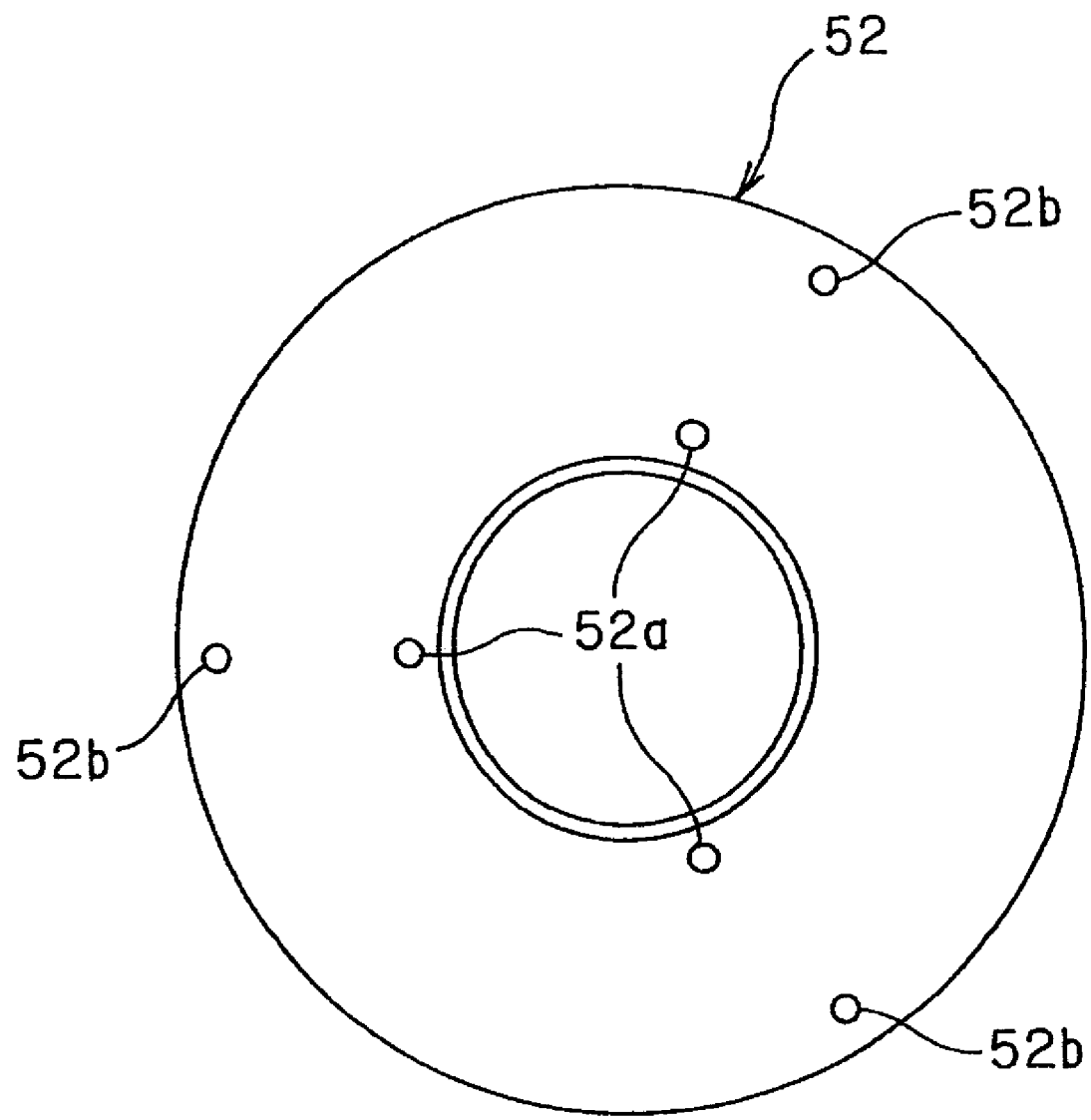
FIG. 3 is a plan view of an engine attachment plate shown in FIG. 2.

FIG. 3 is a plan view of the plate 52 shown in FIG. 2.

The plate 52 having a doughnut shape is provided with a plurality of, i.e., three holes 52a into which bolts (fasteners) 54 (shown in FIG. 2) for connecting the plate 52 and engine case 24 are inserted, and a plurality of, i.e., three holes 52b into which bolts (fasteners) 56 (shown in FIG. 2) for connecting the plate 52 and the upper motor case 32a are inserted.

Screw holes 24a are formed at the lower surface of the engine case 24 so as to correspond to the holes 52a of the plate 52, so that they can be engaged with the bolts 54. Screw holes 32a2 are also formed at the upper surface of the upper motor case 32a to correspond to the holes 52b of the plate 52, so that they can be engaged with the bolts 56.

The bolts 54 are inserted through the holes 52a of the plate 52 into the screw holes 24a of the engine case 24 to be engaged therewith, thereby connecting the plate 52 and engine case 24. Similarly, the bolts 56 are inserted through the holes 52b of the plate into the screw holes 32a2 of the upper motor case 32a to be engaged therewith, thereby connecting the plate 52 and upper motor case 32a. Thus the engine case 24 is connected to the upper motor case 32a through the plate 52.

At appropriate positions, more precisely, on the axes of the screw holes 24a of the engine case 24 in the upper surface of the clutch housing 46 are formed with a plurality of, i.e., three holes 46a (only one shown in FIG. 2) into which bolts (fasteners) 60 for connecting the clutch housing 46 and lower motor case 32b are inserted. Screw holes 32b1 are formed at the lower surface of the lower motor case 32b so as to correspond to the holes 46a of the clutch housing 46, so that they can be engaged with the bolts 60.

The bolts 60 are inserted through the holes 46a of the clutch housing 46 into the screw holes 32b1 of the lower motor case 32b to be engaged therewith, thereby connecting the clutch housing 46 and lower motor case 32b.

The explanation of FIG. 1 will be resumed. The vertical shaft 42 is aligned parallel to the vertical direction and supported to be rotatable about the vertical axis within a frame pipe 62 attached downward of the clutch housing 46. As shown in the figure, a part of the frame pipe 62 and the entire gear case 66 are provided at a location in water, i.e., under the water surface when the outboard motor 10 is attached to the boat 16. In FIG. 1, the symbol W indicates seawater or freshwater.

A propeller shaft 70 is supported to be rotatable about the horizontal axis within the gear case 66. One end of the propeller shaft 70 projects from the gear case 66 to rearward of the outboard motor 10 and is attached with a propeller 72. A bevel gear 74 is installed on the outer periphery of the propeller shaft 70 and is rotated by engagement with a pinion gear 64.

Thus the output, i.e., rotational output of the motor 30 is transmitted through the electromagnetic clutch 44, interlock unit 40, vertical shaft 42, pinion gear 64 and bevel gear 74 to the propeller shaft 70 to rotate the propeller 72, thereby producing thrust for driving the boat 16 forward or rearward.

The output, i.e., rotational output of the engine 20 is transmitted through the centrifugal clutch 34 to the output shaft 30b of the motor 30 and then, like the output of the motor 30, through the electromagnetic clutch 44, interlock unit 40, vertical shaft 42, pinion gear 64 and bevel gear 74 to the propeller shaft 70 to rotate the propeller 72, thereby producing thrust for driving the boat 16 forward or rearward.

As explained in the foregoing, the outboard motor 10 comprises a hybrid outboard motor that is equipped with the power sources comprising the engine 20, the motor 30 and a combination of the engine 20 and motor 30, and with a drive unit for transmitting an output of one of the engine 20 and the motor 30 to drive the propeller 72, i.e., drive shaft of the propeller 72 (more specifically, vertical shaft 42, propeller shaft 70 etc.), and is constituted as a relatively small hybrid outboard motor.

The outboard motor 10 is equipped with a bar handle or tiller 74 at an appropriate position, precisely at the clutch housing 46. The free end of the bar handle 74 projects toward the cockpit of the boat 16 so as to be operable for the boat operator, as shown in FIG. 1. The frame pipe 62 is supported by the stern brackets 14 to be rotatable about the vertical axis, so that the operator can steer or maneuver the outboard motor 10 left and right by swinging the bar handle 74 laterally.

A throttle grip 76 is provided at the forward (free) end of the bar handle 74 (relative to the direction of forward travel of the boat 16). The throttle grip 76 can be rotatably operated by the boat operator and is installed with a rotation angle sensor (volume sensor) 80 therein. The rotation angle sensor 80 produces an output or signal proportional to the rotation angle (manipulated variable) of the throttle grip 76 to be inputted to an electronic control unit (ECU) 82 constituted as a microcomputer. Based on the inputted signal, the ECU 82 controls the output of the motor 30 to regulate the speed of the boat 16.

The throttle grip 76 is also connected via a push-pull cable (not shown) to a throttle valve (not shown) of the engine 20. As a result, the operation of the throttle grip 76 makes the throttle valve open or close to control the engine speed, thereby regulating the boat speed.

The bar handle 74 is further equipped with a mode (selector) switch 84 that produces signals in response to instructions inputted by the operator including those to start or stop the power sources (engine 20, motor 30) and send the same to the ECU 82. The ECU 82 controls the operation of the engine 20, motor 30, electromagnetic clutch 44 and the other components in response to the inputted outputs.

The interlock unit 40 that interlocks the output shaft 30b of the motor 30 with the upper end of the vertical shaft 42, i.e., the power source with the drive unit, will be explained in detail.

Figure 4:
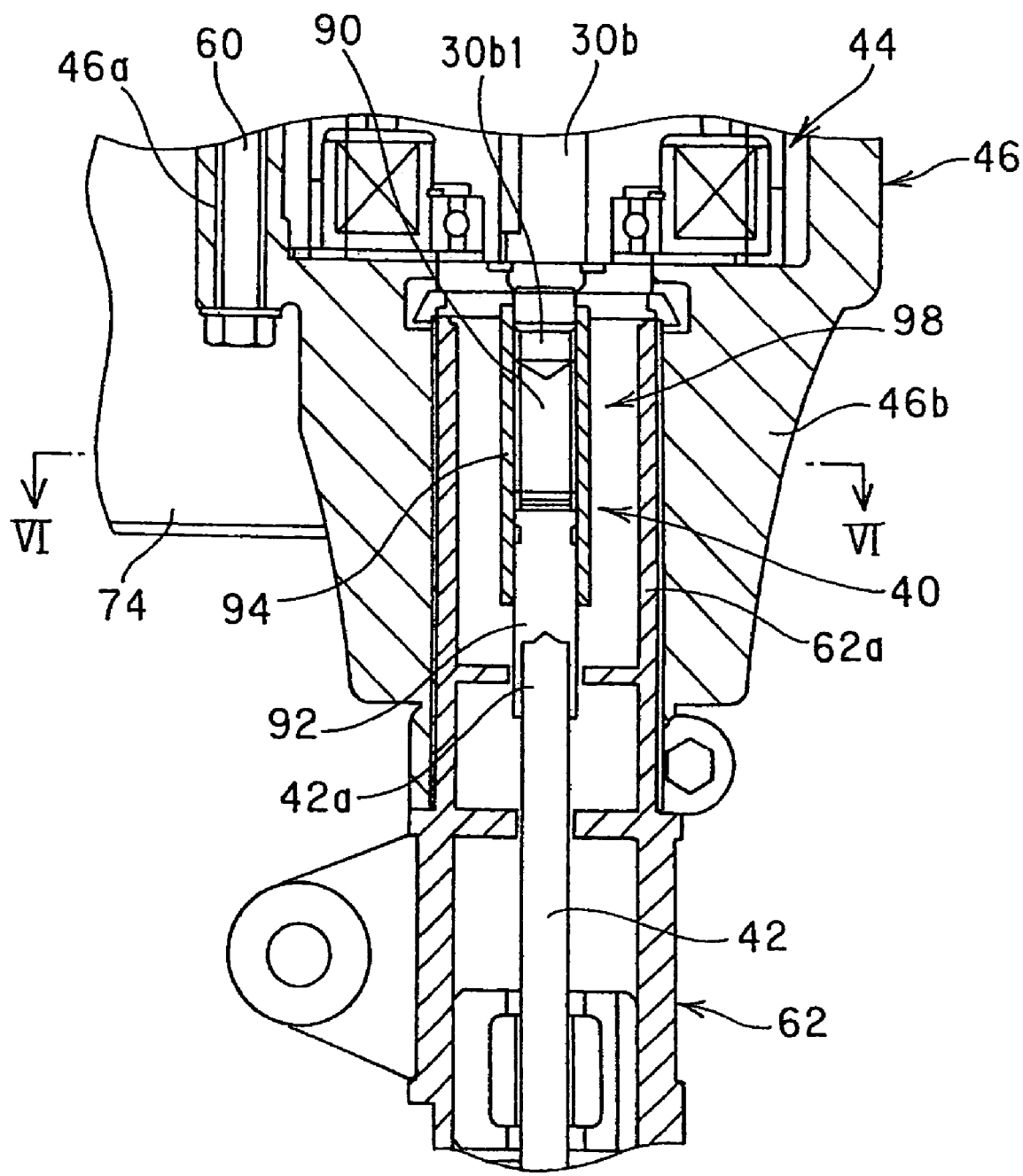
FIG. 4 is an enlarged partially sectional view showing the vicinity of an interlock unit shown in FIG. 1.
Figure 5:
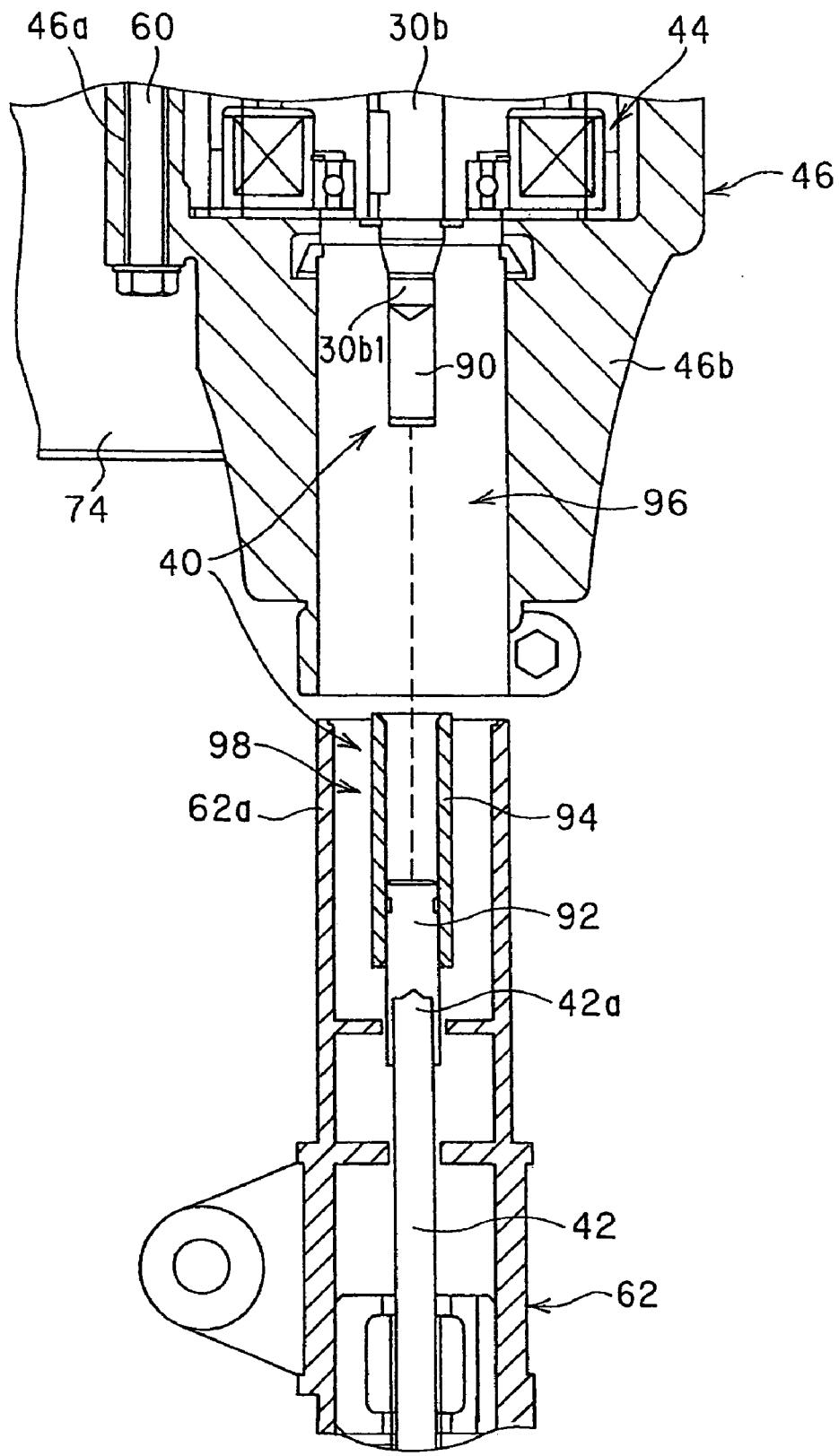
FIG. 5 is an enlarged partially sectional view similar to FIG. 4 but showing the interlock unit shown in FIG. 4 in its state of un-interlocking the power source and a drive unit.

FIG. 4 is an enlarged partially sectional view showing the vicinity of the interlock unit 40 shown in FIG. 1 and FIG. 5 is an enlarged partially sectional view similar to FIG. 4 but showing the interlock unit 40 shown in FIG. 4 in its state of un-interlocking the power source and the drive unit.

As shown in FIGS. 4 and 5, the interlock unit 40 is provided with a rod (first interlock member) 90 extending from (connected to or formed at) the lower end 30b1 of the output shaft 30b of the motor 30 (i.e., connected to the power source) and a hollowed stern (second interlock member) 94 connected to the drive unit, i.e., the upper end 42a of the vertical shaft 42 through a coupling member 92 to receive the rod 90.

A coupler 46b of roughly cylindrical shape is formed near the lower end of the clutch housing 46. The interior of the coupler 46b is formed with a space 96 (shown only in FIG. 5) which receives or accommodates the lower end 30b1 of the output shaft 30b and the rod 90. The frame pipe 62 is formed near its upper end with a roughly cylindrical projection 62a. The interior of the projection 62a is formed with a space 98 which receives or accommodates the upper end 42a of the vertical shaft 42, the coupling member 92 and the hollowed stern 94.

Figure 6:
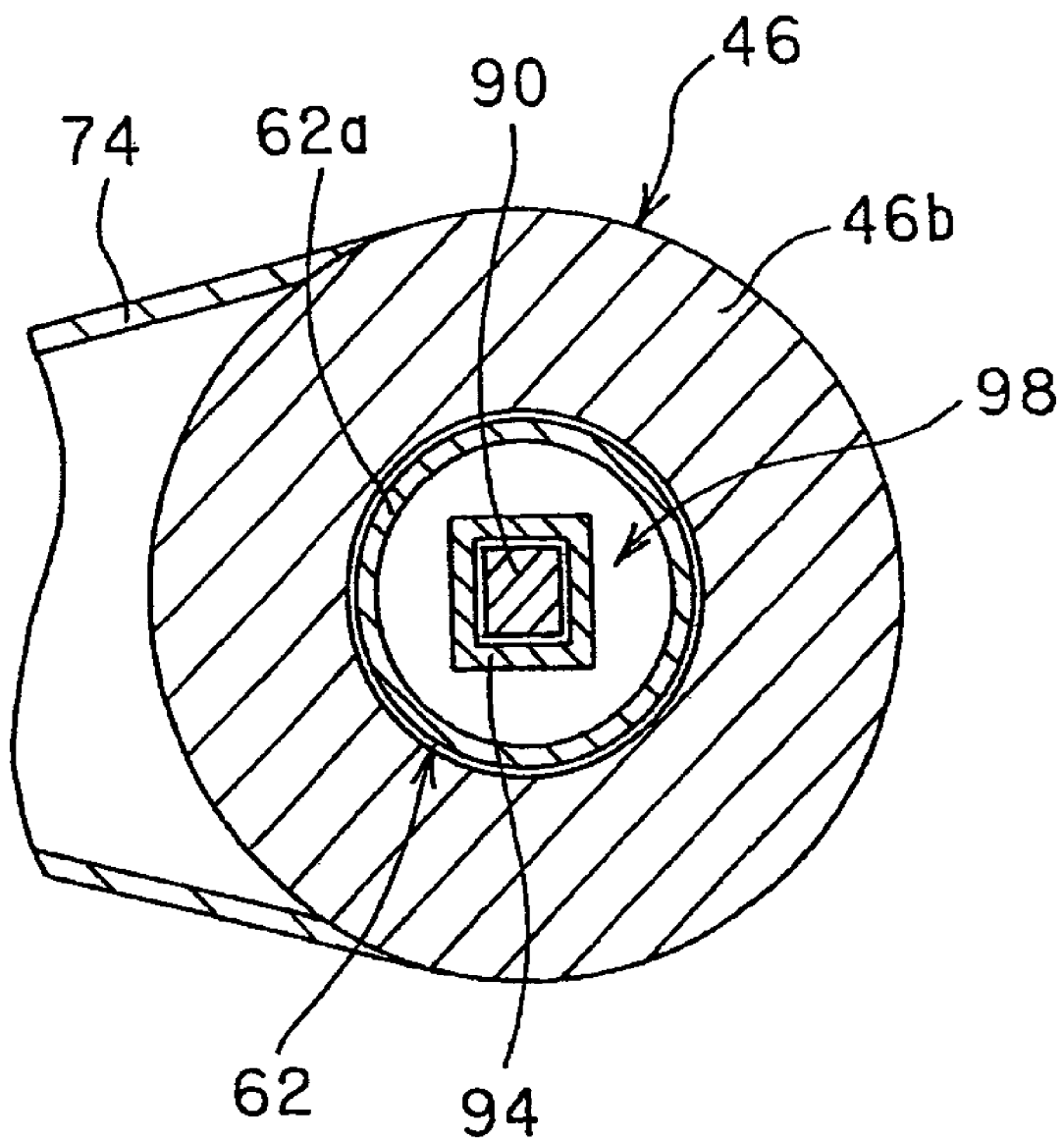
FIG. 6 is a cross-sectional view taken along line VI-VI in FIG. 4.

FIG. 6 is a cross-sectional view taken along line VI-VI in FIG. 4.

As shown in FIG. 6, the rod 90 is made of a solid body of polygonal (i.e., substantially square) shape when viewed in cross-section. The hollowed stern 94 is a hollow body of similar polygonal shape (i.e., substantially square) when viewed in cross-section. The interior of the hollowed stern 94 is shaped to receive the rod 90.

When establishing the engagement between the rod 90 and hollowed stern 94, which make up the interlock unit 40, the output shaft 30b of the motor 30 is connected to the vertical shaft 42. On the other hand, as shown in FIG. 5, when the rod 90 is removed from the hollowed stern 94, the output shaft 30b is disconnected from the vertical shaft 42. The power sources and drive unit are detachably interlocked through the interlock unit 40.

Figure 7:
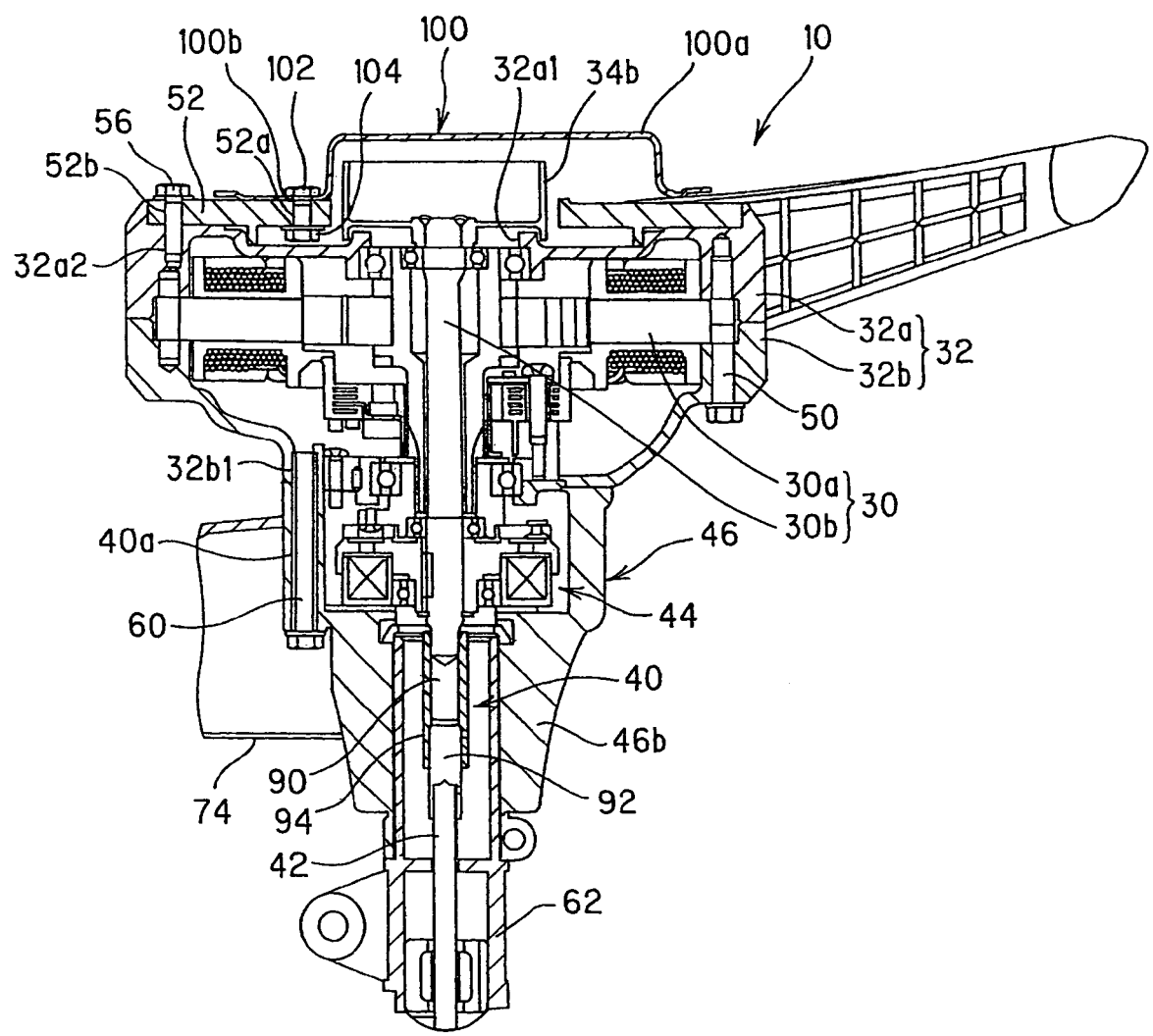
FIG. 7 is a view partially similar to FIG. 2 but showing the configuration in which the motor is interlocked to the drive unit as the power source.

FIG. 7 is a view partially similar to FIG. 2 but shows the configuration in which the motor 30 is interlocked to the drive unit as the power source.

The change of the power source from the combination of the engine 20 and motor 30 to the motor 30 will be explained.

Figure 8:
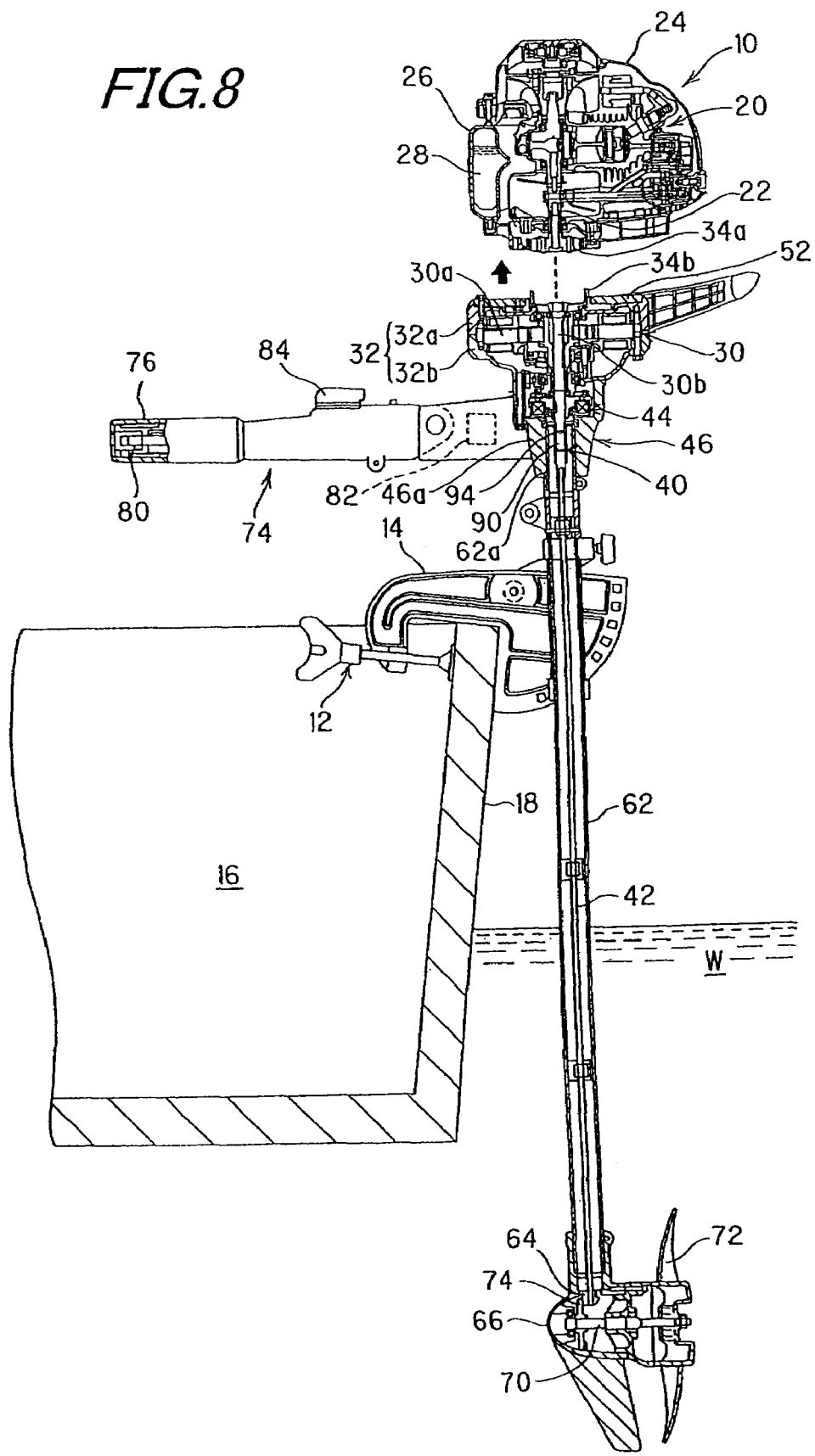
FIG. 8 is a view similar to FIG. 1 but showing this change of the power source from the combination to the motor.

FIG. 8 is a view similar to FIG. 1 but showing this change of the power source from the combination to the motor 30.

The bolt 54 (shown in FIG. 2) is first unfastened and the engine 20 and engine case 24 are removed from the motor 30 and motor case 32 (more precisely the upper motor case 32a). As shown in FIG. 8, the centrifugal clutch 34 installed between the engine 20 and motor 30 is now split into clutch shoe 34a and clutch outer 34b. Then, a motor case cap 100 is attached to the upper motor case 32a, more specifically to the plate 52 installed above the upper motor case 32a.

Figure 9:
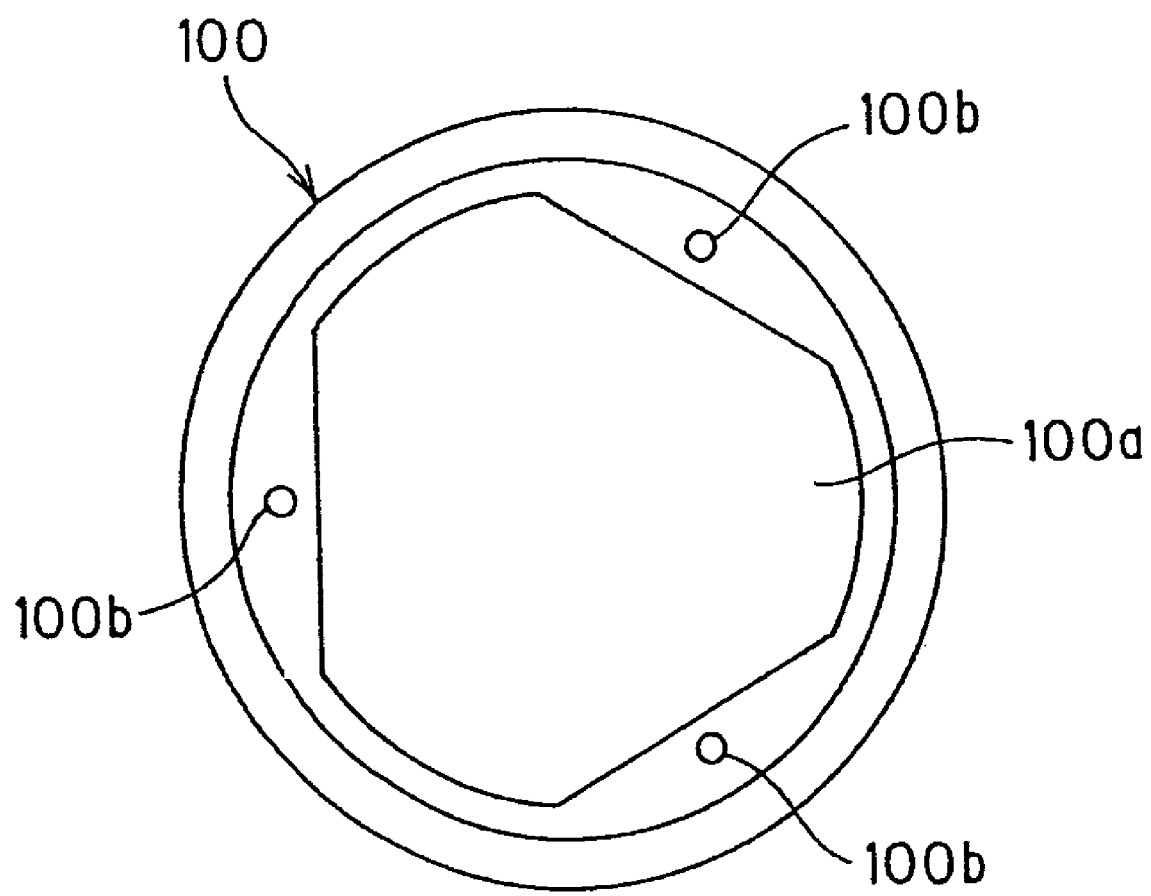
FIG. 9 is a plan view of a motor case cap shown in FIG. 7.

FIG. 9 is a plan view of the motor case cap 100 shown in FIG. 7.

As shown in FIG. 7 and FIG. 9, the motor case cap 100 has a disc-like shape in plan view and a cup-like shape in cross section to form a recess 100a where the clutch outer 34b is housed. The cap 100 is formed with three holes 100b at the positions corresponding to the screw holes 52a formed at the plate 52.

The motor case cap 100 is connected to the plate 52 by inserting a bolt 102 in each of the holes 100b of the motor case cap 100 and holes 52a of the plate 52 and by fastening it by a nut 104, as shown in FIG. 7. With this, the opening 32a1 of the upper surface of the upper motor case 32a is surely covered, thereby enabling to prevent seawater or dust from entering inside the outboard motor through the upper motor case opening 32a1.

The power source of outboard motor 10 is thus changed from the combination of the engine 20 and motor 30 to the motor 30. In the change, the interlock unit 40 itself is left as it is and is not needed to be removed. In other words, the interlock unit for interlocking the motor 30 to the drive unit is made same as the interlock unit for interlocking the combination to the drive unit.

Figure 10:
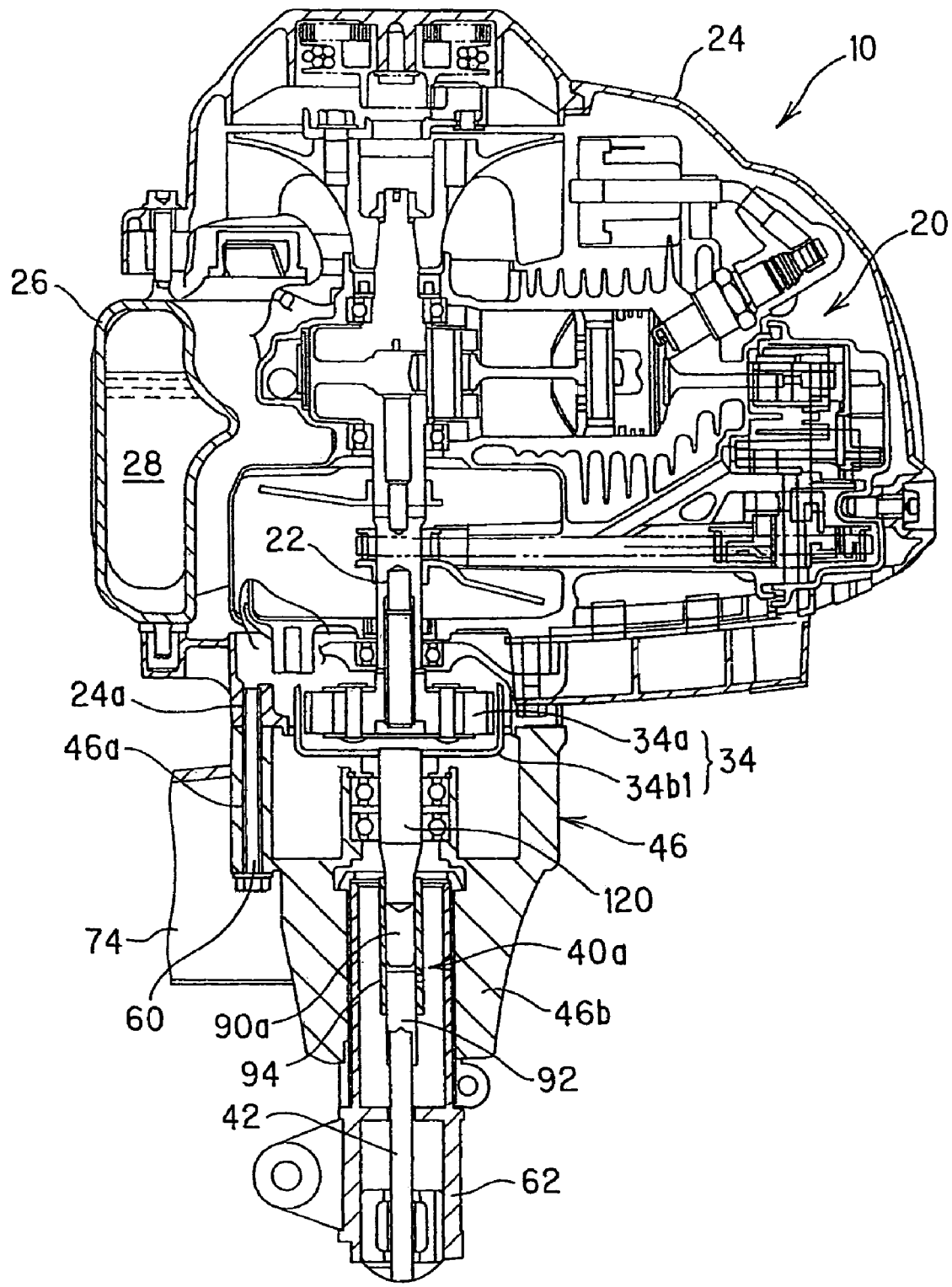
FIG. 10 is a view partially similar to FIG. 2 but showing the configuration in which the engine is interlocked to the drive unit as the power source.

FIG. 10 is a view partially similar to FIG. 2 but showing the configuration in which the engine 20 is interlocked to the drive unit as the power source.

Next, the change of the power source from the combination of the engine 20 and motor 30 to the engine 20 will be explained.

Figure 11:
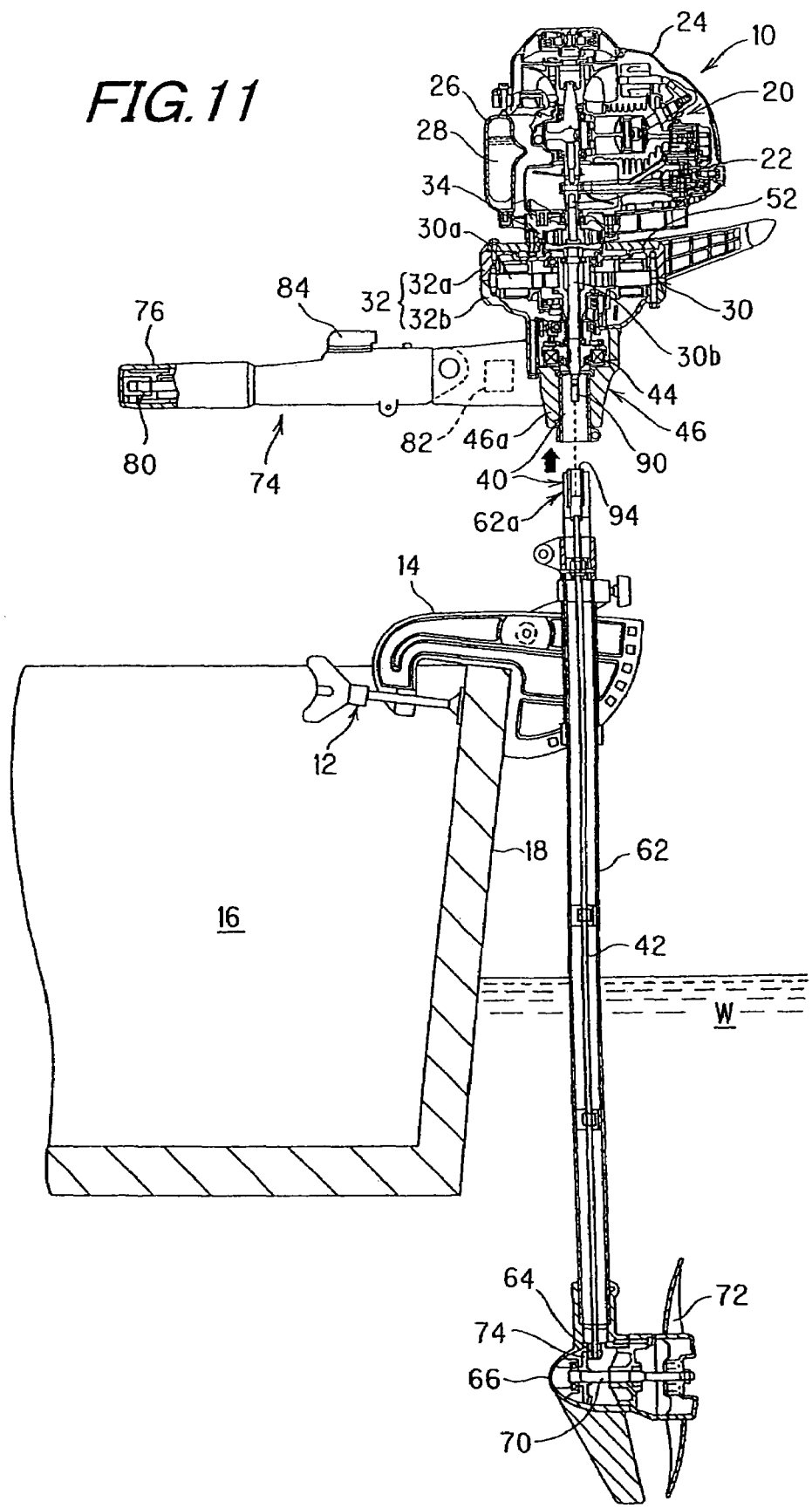
FIG. 11 is a view similar to FIG. 1 but showing this change of the power source from the combination to the engine.

FIG. 11 is a view similar to FIG. 1 but showing this change of the power source from the combination to the engine 20.

As shown in FIG. 11, the engine 20, engine case 24, motor 30 and clutch housing 24, etc., are lifted upward, and the power source is then removed, specifically, the rod 90 formed at the output shaft 30b of the motor 30 is removed from the hollowed stern 94 of the vertical shaft 42.

Then, the bolts 54, 56, 60 (shown in FIG. 2) are all unfastened and the motor 30 and motor case 32 are removed from the engine 20, engine case 24 and clutch housing 46. At that time, the centrifugal clutch 34 can be split into the clutch shoe 34a and clutch outer 34b.

Then, as shown in FIG. 10, the clutch housing 46 is attached to the frame pipe 62 and the power source (engine 20) is interlocked to the drive unit through a second interlock unit 40a.

Specifically, an output shaft 120 (for transmitting output from the crankshaft 22 to the vertical shaft 42) is rotatably inserted in the clutch housing 46. The output shaft 120 is formed, at its upper end, with a second clutch outer 34b1 that has an almost same shape as the clutch outer 34b and at its lower end, with a second rod (first interlock member) 90a that has a similar shape to the rod 90.

The centrifugal clutch 34 can be completed if the second rod 90a of the output shaft 120 is inserted in the hollowed stern (second interlock member) 94 of the vertical shaft 42 and if the second clutch outer 34b1 is connected to the clutch shoe 34a of the crankshaft 22. With this, the rotational output of the engine 20 can be transmitted to the vertical shaft 42 through the centrifugal clutch 34, output shaft 120 and second interlock unit 40a.

Next, the engine case 24 is connected to the clutch housing 46 by inserting the bolt (fastener) 60 into each of the holes 46a of the clutch housing 46 and the holes 24a of the engine case 34 and by fastening it. The power source of outboard motor 10 is thus changed from the combination of the engine 20 and motor 30 to the engine 20.

As stated above, the second interlock unit 40a for interlocking the engine 20 to the drive unit is made similar in shape as the interlock unit 40 for interlocking the combination (of the engine 20 and motor 30) and motor 30 to the drive unit. More specifically, the second interlock unit 40a is different from the interlock unit 40 in that the shape of the second rod 90a is made similar to the rod 90.

The exemplary embodiment is thus configured to have an outboard motor (10) adapted to be mounted on a stern of a boat (16) and having a propeller (72) to propel the boat, comprising: a power source which produces rotational output; a drive unit including a vertical shaft (42) which transmits the rotational output of the power source to the propeller through a gear mechanism; and an interlock unit (40, 40a) which detachably interlocks one of an internal combustion engine (20), an electric motor (30) and a combination of the engine and the motor to the drive unit as the power source.

In the outboard motor, the interlock unit comprises one of a first interlock unit (second interlock unit 40a) for interlocking the engine to the drive unit, and a second interlock unit (interlock unit 40) for interlocking one of the motor and the combination of the engine and the motor to the drive unit, and the first and second interlock units are made similar in shape.

In the outboard motor, each of the first and seconds interlock units comprises a first interlock member (rod 90, 90a) connected to the power source, a second interlock member (hollowed stern 94) connected to the drive unit and a fastener (bolts 54, 56 60) for detachably fastening the one of the power sources to the drive unit through the first interlock member and the second interlock member.

In the outboard motor, the motor (30) is located between the engine (20) and the interlock (40) unit in the combination of the engine (20) and the motor (30) when interlocked to the drive unit.

In the outboard motor, the motor (30) is interlocked to the drive unit through the second interlock unit (40) with the engine (20) removed.

In the outboard motor, the motor (30) is covered by a motor case cap (100).

The outboard motor further includes: a first clutch (44) which connects/disconnects the rotational output of the power source (engine 20, motor 30) to be transmitted to the propeller (72).

In the outboard motor, the first clutch comprises an electromagnetic clutch (44).

The outboard motor further includes: a second clutch (34) disposed between the engine (20) and the motor (30) which transmits the rotational output of the engine to the drive unit through an engine output shaft and a motor output shaft, when the engine is operated.

In the outboard motor, the second clutch comprises a centrifugal clutch (34).

In the outboard motor, the engine (20) is started by the motor and when a speed of the engine exceeds a predetermined speed, the motor is rotated by the engine to produce electric energy that is charged by a battery.

The outboard motor further includes: a bar handle (74) installed to be operable by an operator; a throttle grip (76) provided at the bar handle to be rotatable by the operator to regulate an opening of a throttle valve of the engine.

The outboard motor further includes: a rotation angle sensor (80) installed in the bar handle which outputs a signal indicative of a rotation angle of the throttle grip; and a controller (ECU 82) installed inside the throttle grip which inputs the outputted signal of the rotation angle sensor to control operation of the motor in response to the outputted signal of the sensor.

In the outboard motor, the bar handle (74) is further equipped with a mode switch (84) that produces signal in response to instructions inputted by the operator to start or stop the engine (20) and the motor (30), and the controller (ECU 82) controls the operation of the engine and the motor in response to the signal of the mode switch.

It should be noted that, although the embodiment has been explained to change the power source from the combination of the engine 20 and motor 30 to the engine 20 or motor 30, it is of course possible to change the power source from the engine 20 or motor 30 to the combination, or to change from the engine 20 to the motor 30 and vise versa.

It should also be noted that, although the embodiment explained in the foregoing uses a DC brushless motor as the electric motor 30, a different type of motor can be used instead.

It should further be noted that, although in the foregoing the engine 20 has been said to have a displacement of about 50 cc and the electric motor 30 to have an output of several hundred Watts, these values are non-limitative examples.

While the invention has thus been shown and described with reference to specific exemplary embodiments, it should be noted that the invention is in no way limited to the details of the described arrangements; changes and modifications may be made without departing from the scope of the appended claims.

What is claimed is:

1. A boat comprising:
    a stern;
    an outboard motor mounted on the stern of the boat; and
    a propeller operatively connected to the outboard motor;
        said propeller adapted to propel the boat;
        said outboard motor comprising:
        a changeable power source which produces rotational output;
        a drive unit which transmits the rotational output of the changeable power source to the propeller through a gear mechanism; and
        an interlock unit which detachably interlocks the changeable power source to the drive unit;
        wherein:
        said changeable power source includes an internal combustion engine and an electric motor, wherein the engine and the electric motor may be operated in combination;
        said interlock unit having a first interlocking configuration and a second interlocking configuration substantially similar to the first interlocking configuration;
        said first interlocking configuration of the interlock unit is applied for interlocking the engine to the drive unit; and
        said second interlocking configuration of the interlock unit is applied for interlocking one of the electric motor and the combination to the drive unit.

2. A boat according to claim 1, wherein each of the first and second interlocking configurations includes a first interlock member connected to the changeable power source, a second interlock member connected to the drive unit and a fastener for detachably fastening the changeable power source to the drive unit through the first interlock member and the second interlock member.

3. A boat according to claim 1, wherein the electric motor is located between the internal combustion engine and the interlock unit in the combination of the engine and the electric motor when interlocked to the drive unit.

4. A boat according to claim 3, wherein the electric motor is configured to be interlocked to the drive unit through the second interlocking configuration of the interlock unit with the engine removed.

5. A boat according to claim 4, wherein the electric motor is covered by a motor case cap.

6. A boat according to claim 1, further comprising
a bar handle operable by an operator; and
a throttle grip provided at the bar handle to be rotatable by the operator to regulate an opening of a throttle valve of the engine.

7. A boat according to claim 6, further comprising
a rotation angle sensor installed in the bar handle which outputs a signal indicative of a rotation angle of the throttle grip; and
a controller installed inside the throttle grip which inputs the outputted signal of the rotation angle sensor to control operation of the motor in response to the outputted signal of the sensor.

8. A boat according to claim 7, wherein the bar handle is further equipped with a mode switch that produces a signal in response to instructions inputted by the operator to start or stop the engine and the motor, and the controller controls the operation of the engine and the motor in response to the signal of the mode switch.

9. A boat according to claim 1, further including:
a first clutch which selectively connects and disconnects the rotational output of the changeable power source to be transmitted to the propeller.

10. A boat according to claim 9, wherein the first clutch comprises an electromagnetic clutch.

11. A boat according to claim 1, further including:
a second clutch disposed between the engine and the motor which transmits the rotational output of the engine to the drive unit through an engine output shaft and a motor output shaft, when the engine is operated.

12. A boat according to claim 11, wherein the second clutch comprises a centrifugal clutch.

13. A boat according to claim 12, wherein the engine is started by the electric motor and when a speed of the engine exceeds a predetermined speed, the electric motor is rotated by the engine to produce electric energy that charges a battery.

* * * * *